United States Patent [19]

Cromer et al.

[11] Patent Number: 6,131,911
[45] Date of Patent: Oct. 17, 2000

[54] BRUSH SEALS AND COMBINED LABYRINTH AND BRUSH SEALS FOR ROTARY MACHINES

[75] Inventors: Robert Harold Cromer, Johnstown; Norman Arnold Turnquist, Cobleskill, both of N.Y.

[73] Assignee: General Electric Co., Schenectady, N.Y.

[21] Appl. No.: 09/027,128

[22] Filed: Feb. 20, 1998

Related U.S. Application Data

[63] Continuation-in-part of application No. 08/672,665, Jun. 28, 1996, abandoned, which is a continuation-in-part of application No. 08/438,228, May 9, 1995, which is a division of application No. 08/342,011, Nov. 16, 1994, Pat. No. 5,474,306, which is a continuation of application No. 07/978,731, Nov. 19, 1992, abandoned.

[51] Int. Cl.$^7$ .................................................. F16J 15/447
[52] U.S. Cl. ............................................................ 277/355
[58] Field of Search ............................................. 277/355

[56] References Cited

U.S. PATENT DOCUMENTS

| | | |
|---|---|---|
| 1,689,735 | 10/1928 | Losel . |
| 1,857,961 | 5/1932 | Lamb . |
| 2,336,323 | 12/1943 | Warren . |
| 2,543,615 | 2/1951 | Trumpler . |
| 4,202,554 | 5/1980 | Snell . |
| 4,358,120 | 11/1982 | Moore . |
| 4,541,741 | 9/1985 | Woodbridge . |
| 4,580,346 | 4/1986 | Reichl . |
| 4,730,876 | 3/1988 | Werner et al. . |
| 4,756,536 | 7/1988 | Belcher . |
| 4,781,388 | 11/1988 | Wörhl . |
| 4,809,990 | 3/1989 | Merz . |
| 4,971,336 | 11/1990 | Ferguson . |
| 4,989,886 | 2/1991 | Rulis . |
| 5,026,252 | 6/1991 | Hoffelner . |
| 5,029,875 | 7/1991 | Spain et al. . |
| 5,066,025 | 11/1991 | Hanrahan . |
| 5,074,748 | 12/1991 | Hagle . |
| 5,076,590 | 12/1991 | Steinetz et al. . |
| 5,090,710 | 2/1992 | Flower . |
| 5,106,104 | 4/1992 | Atkinson et al. . |
| 5,110,033 | 5/1992 | Noone et al. . |
| 5,114,159 | 5/1992 | Baird et al. . |
| 5,135,237 | 8/1992 | Flower . |
| 5,174,582 | 12/1992 | Ferguson . |
| 5,176,389 | 1/1993 | Noone et al. . |
| 5,181,728 | 1/1993 | Stec . |
| 5,192,084 | 3/1993 | Norbury . |
| 5,201,530 | 4/1993 | Kelch et al. . |
| 5,316,318 | 5/1994 | Veau . |
| 5,318,309 | 6/1994 | Tseng et al. . |

(List continued on next page.)

FOREIGN PATENT DOCUMENTS

| | | |
|---|---|---|
| 0453315 A1 | 10/1991 | European Pat. Off. . |
| 2938-484 | 3/1981 | Germany . |
| 3-209068 | 9/1991 | Japan . |
| 2 191 825 | 12/1987 | United Kingdom . |
| 2 301 635 | 12/1996 | United Kingdom . |
| WO92/05378 | 4/1992 | WIPO . |

*Primary Examiner*—Lynne H. Browne
*Assistant Examiner*—John L. Beres
*Attorney, Agent, or Firm*—Nixon & Vanderhye

[57] ABSTRACT

A brush seal is comprised of arcuate seal segments having ends cut in a radial direction with bristles "canted" at an approximate 45° angle relative to radii of the segments, leaving triangular regions adjacent one end of each segment void of bristles at the junction of the segments. The brush seals are retrofit into conventional labyrinth seals with the backing plate for the bristles comprising a labyrinth tooth profile extending fully 360° about the seal, including those areas where bristles are not present or only in the areas where bristles are not present. A support is provided at the juncture of the segments and to which support proximal ends of additional bristles are secured to project at an approximate 45° angle relative to the segments at their juncture. Those additional bristles fill in the triangular region void of bristles when the support is secured to the end of the segment having the void whereby a full 360° array of sealing bristles are provided.

20 Claims, 6 Drawing Sheets

U.S. PATENT DOCUMENTS

| | | |
|---|---|---|
| 5,335,920 | 8/1994 | Tseng et al. . |
| 5,351,971 | 10/1994 | Short . |
| 5,400,586 | 3/1995 | Bagepalli et al. . |
| 5,401,036 | 3/1995 | Basu . |
| 5,474,305 | 12/1995 | Flower . |
| 5,474,306 | 12/1995 | Bagepalli et al. . |
| 5,480,165 | 1/1996 | Flower . |
| 5,586,860 | 12/1996 | Bertrand et al. . |
| 5,597,167 | 1/1997 | Snyder . |
| 5,630,590 | 5/1997 | Bouchard et al. . |
| 5,749,584 | 5/1998 | Skinner et al. ............... 277/355 |

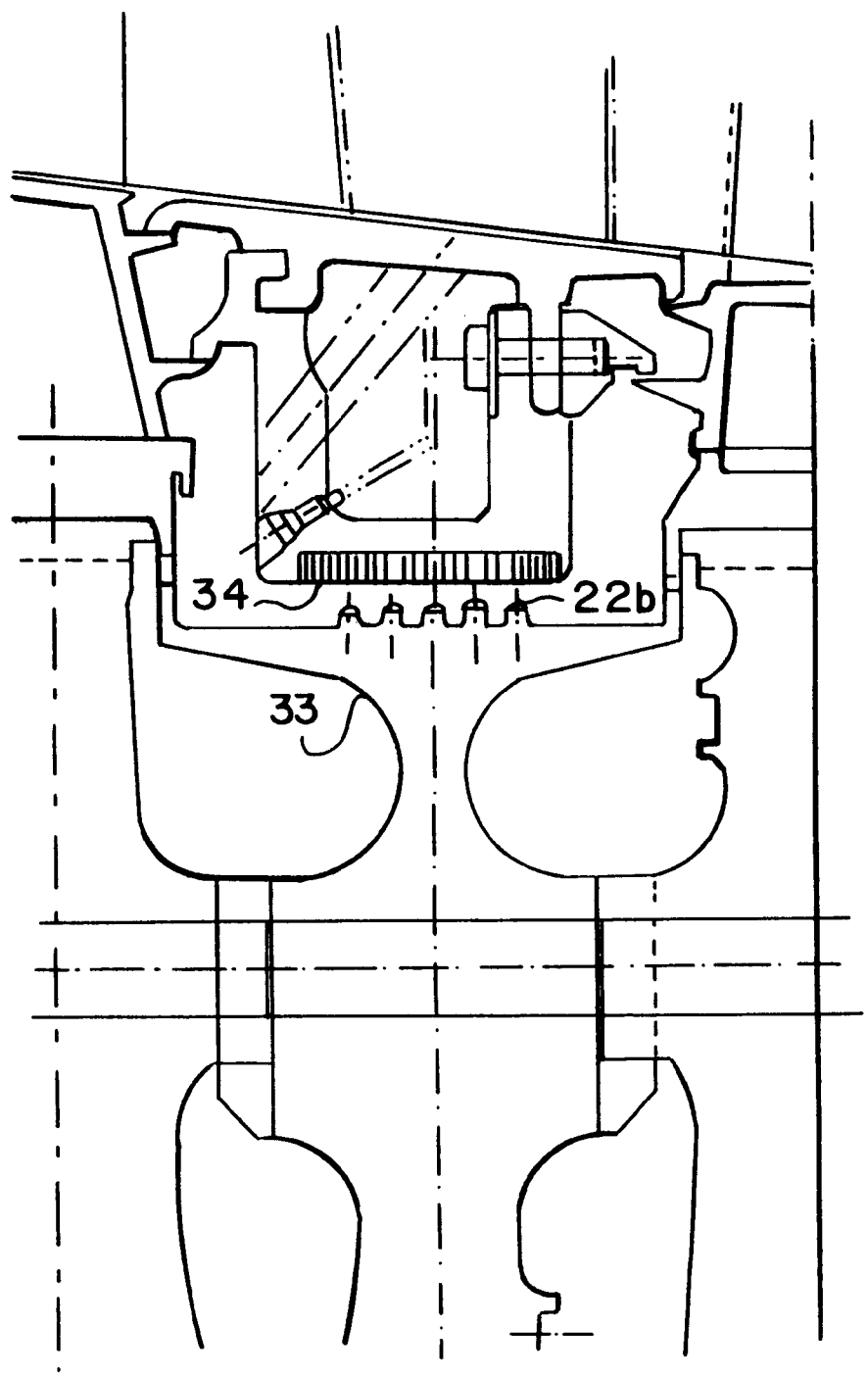
Fig. 3 *(Prior Art)*

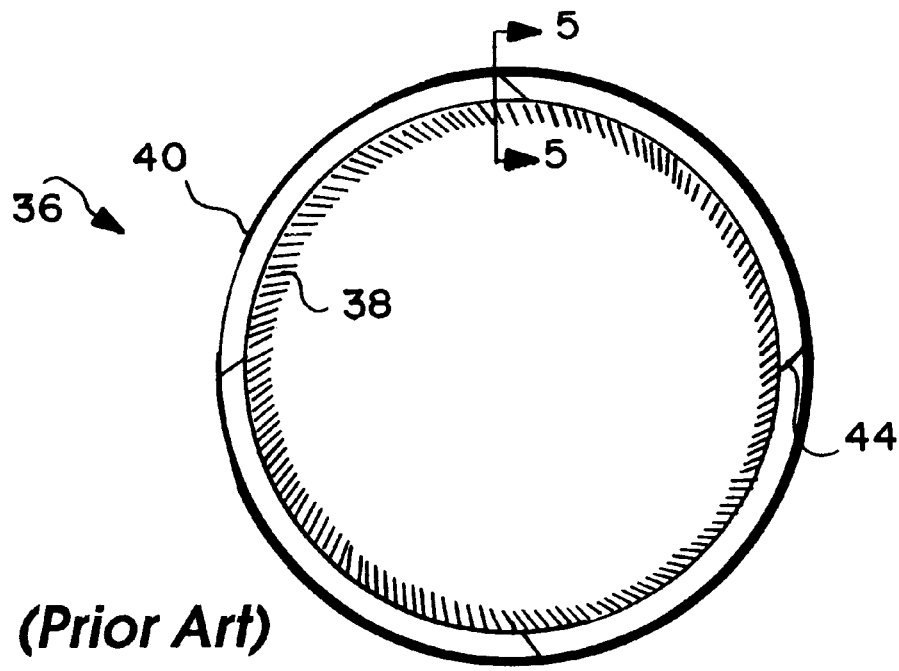
Fig. 4 *(Prior Art)*
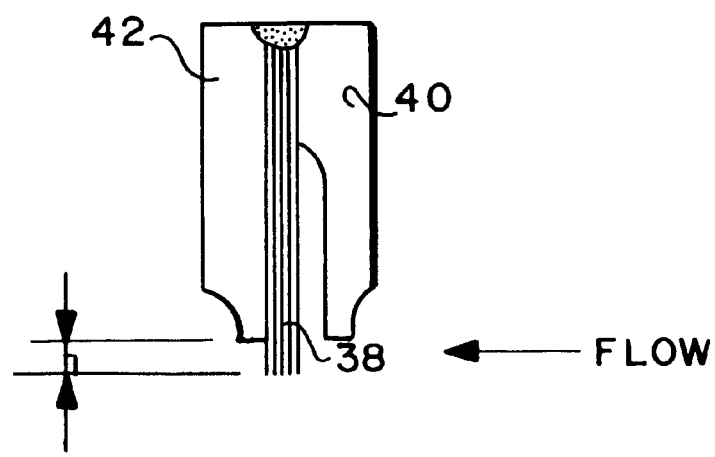
Fig. 5 *(Prior Art)*

BRUSH SEALS AND COMBINED LABYRINTH AND BRUSH SEALS FOR ROTARY MACHINES

RELATED APPLICATIONS

This application is a continuation-in-part of application Ser. No. 08/672,665, filed Jun. 28, 1996, now abandoned, which in turn is a continuation-in-part of application Ser. No. 08/438,228, filed May 9, 1995, which in turn is a division of application Ser. No. 08/342,011, filed Nov. 16,1994, now U.S. Pat. No. 5,474,306 and which in turn is a continuation of application Ser. No. 978,731, filed Nov. 19, 1992, now abandoned, the disclosures of which are incorporated herein by reference.

TECHNICAL FIELD

The present invention relates to brush seals for rotary machines such as steam and gas turbines and particularly relates to brush seals and labyrinth-brush seal combinations for use with rotary machines.

BACKGROUND

Rotary machines, such as steam and gas turbines, used for power generation and mechanical drive applications are generally large machines consisting of multiple turbine stages. In turbines, high pressure fluid flowing through the turbine stages must pass through a series of stationary and rotating components, and seals between the stationary and rotating components are used to control leakage. The efficiency of the turbine is directly dependent on the ability of the seals to prevent leakage, e.g., between the rotor and stator. Turbine designs are conventionally classified as either impulse, with the majority of the pressure drop occurring across fixed nozzles, or reaction, with the pressure drop more evenly distributed between the rotating and stationary vanes. Both designs employ rigid tooth, i.e., labyrinth, seals to control leakage. Traditionally, rigid labyrinth seals of either a hi-lo or straight shaft design are used. These types of seals are employed at virtually all turbine locations where leakage between rotating and stationary components must be controlled. This includes interstage shaft seals, rotor end seals, and bucket (or blade) tip seals. Steam turbines of both impulse and reaction designs typically employ rigid, sharp teeth for rotor/stator sealing. While labyrinth seals have proved to be quite reliable, their performance degrades over time as a result of transient events in which the stationary and rotating components interfere, rubbing the labyrinth teeth into a "mushroom" profile and opening the seal clearance.

Another type of seal used in many environments, including rotary machines, is a brush seal. Brush seals are generally less prone to leakage than labyrinth seals. A brush seal can also accommodate relative radial movement between fixed and rotational components, for example, between a rotor and a stator, because of the flexure of the seal bristles. Brush seals also generally conform better to surface non-uniformities. The result of using brush seals is better sustained rotary machine performance than is generally possible with labyrinth seals.

DISCLOSURE OF THE INVENTION

In accordance with a preferred embodiment of the present invention, there is provided brush seal segments in the environment of a rotary machine such as a turbine. Brush seals per se have general applicability to rotary machines and can be used in lieu of labyrinth seals. Brush seals are advantageous in that context and provide improved sealing, while occupying considerably less axial space as compared with conventional labyrinth seals. As a result, more compact rotary machine, e.g., turbine, designs can be realized. Alternatively, by employing brush seals, the span that would normally be occupied by labyrinth teeth can be used to allow additional turbine stages, resulting in increased turbine efficiency. As a further advantage, application of brush seals at end packing locations can reduce leakage to the point that the need for a gland sealing/exhauster system, for example, in a steam turbine, is eliminated. At rotor end seals, it is also possible to use brush seals in conjunction with face seals. Further, in certain steam rotary machine applications, some leakage is desirable for cooling of components such as rotors. At these locations, brush seals can be used in conjunction with orifices or other flow bypass mechanisms to ensure that the proper amount of leakage is obtained.

A typical brush seal for use in the present invention comprises a bristle pack, i.e., bristles sandwiched between two metallic plates. The bristles are generally alloy steel wires, drawn to a diameter of 0.002–0.006 inches, although the exact diameter depends on the specific seal application. Larger wire diameters are used for seals exposed to a high pressure differential between the upstream and downstream sides. The backing (downstream) plate, or in the present invention a labyrinth tooth, prevents the bristles from deflecting axially under pressure load. As a result, fence height (h) is a critical design variable. Fence height is the distance the bristles extend freely from their support, i.e., the distal end of the support plate or contact points between the bristles and the labyrinth tooth, to their free ends, which typically are in engagement with the rotating component. For a steam turbine application, where the expected maximum radial rotor deflection is approximately 0.040 inches, the fence height must therefore be a minimum of 0.040 inches. Fence heights vary significantly, particularly in gas turbines, depending on the seal location, from 0.030 for bearing seals, to 0.120 for high pressure packing seals to 0.300 for turbine interstage seals.

During shaft radial excursions, the bristles must be able to temporarily deflect without buckling. In order to accommodate these excursions, the bristles are not oriented in a perfectly radial direction, but are instead canted at some angle. Typically, this angle is between 30 and 60 degrees. Increased angles are used to allow for increased radial shaft excursions. If the bristles were straight in a radial direction, the rotor would interfere with the bristles and the bristles would act as columns rather than deflect as beams. This would result in increased wear and not accommodate radial excursions of the shaft.

The bristles of brush seals are typically mounted between a pair of plates or arcuate segments, with the bristles and plates being welded to one another at the ends of the bristles remote from the tips engaging with the opposite component of the seal. In certain brush seal designs, the brush seal is initially formed in an annulus and cut into a number of segments, typically six, but at least two, with the cuts at the ends of each of the segments oriented at the same angle as the "cant" angle of the bristles. That is, with the angle of the bristles typically being on the order of 45° relative to radii of the arcuate segments, the ends of each of the segments are likewise cut at the same angle and therefore parallel the linear extent of the bristles as they project from the segment at that segment end. As a result, the bristles lie at an angle affording the capability of accommodating radial excursions of the rotating component. By cutting the brush seal segments at the angles of the bristles, the bristles may be secured at that angle in the segments without loss of bristles, resulting in an assembled seal with a full 360° of bristles for maximum sealing effectiveness.

In certain applications, however, for example, conventional labyrinth seal packing ring segments for steam turbines, the segments are generally cut in a radial direction not only for ease of manufacturing and assembly but also to facilitate radial movement of the packing ring segments toward and away from the other seal components. Further, when retrofitting brush seals to existing labyrinth seals or supplying brush seals as original equipment in combination with labyrinth seals, it has been found desirable to cut the brush seal segment ends, i.e., consistent with the packing ring segment ends, in a radial direction rather than in the direction of the "cant" of the bristles. This results in making surfaces at the brush seal segment end interfaces that are perfectly straight along radii of the segments with no interlocking pieces and no projections that can be damaged during assembly. However, cutting brush seal segments at the ends of the segments inconsistent with the bristle orientation angle, i.e., the cant angle, results in the loss of an area of the bristles. For example, where a brush seal is employed on a fixed component for sealing about a rotating shaft, the bristles of the brush seal are attached to the seal segments along the outer diameter and project radially inwardly at the cant angle. With the ends of the brush seal segments cut along radii, there are areas at the juncture of the seal segments where no "canted" bristles are present. That is, with the bristles canted, for example, at a 45° angle, and the ends of the segments lying along radii, there is a triangular area on one end of each segment in which bristles do not reside or project. However, the bristles are backed by a support plate in the form of a labyrinth tooth profile. Thus, the labyrinth tooth extends either the full 360° about the seal or in the local regions where bristles are removed by cutting the segments radially, serving as a back-up seal in the event of bristle damage and serving as the primary seal in those areas where the bristles are absent by design. The foregoing is described in U.S. patent application Ser. No. 08/719,667, filed Sep. 25, 1996, of common assignee herewith, the disclosure of which is incorporated herein by reference.

The particular design of that application is useful as a retrofit seal with conventional labyrinth seals or may be used as a stand-alone seal. It is significant in that by cutting the end surfaces of the brush seal segments in a radial direction, the individual segments are free to move radially independently of one another. This is particularly important when the brush seals are retrofit to or provided as original equipment in labyrinth seal segments that are spring-backed or held in place by pressure forces and therefore free to move radially during operation of the machinery as well as severe rotor/seal interferences.

The present invention constitutes an improvement with respect to the seals disclosed in the above-mentioned U.S. patent application Ser. No. 08/719,667. Because the bristles are attached to the backing plate of the brush seal segments along the outer diameter and are canted, segmenting the brush seal radially results in a triangle of lost bristles at a first end of each segment. This results in some loss of sealing effectiveness, part of which is recovered by providing the bristle backing plate with a labyrinth tooth profile as described in the prior application. The loss of sealing, however, is proportional to the number of segments into which the annular brush seal must be divided.

In accordance with the present invention, additional bristles are attached to a support at the juncture of the segments such that the bristles lost during the segmenting process, i.e., forming the radial cuts, are replaced, resulting in a brush seal with bristles projecting over the entire 360° of the seal arc. The support may comprise, for example, a single radially extending plate to which the ends of additional bristles are secured, for example, by welding. The support extends in a radial direction and the bristles are secured at their proximal ends to the support to project distally. The bristles lie at approximately the same cant angle as the bristles of the segments and are therefore of variable length. That is, the bristles carried by the support vary in length in a radial inward direction commencing with the longer bristles at the radially outermost portions of the support and terminating with the shortest bristles at the radially innermost portion of the support. By cutting the segments slightly shorter in length than required and attaching the support to one end of each segment at the juncture of the segment and an adjacent segment such that the proper segment length can be restored, the bristles lost during the segmenting process are replaced, resulting in a brush seal extending a full 360°.

In a preferred embodiment according to the present invention, there is provided an annular brush seal for disposition between a rotatable component having an axis of rotation and another component about said axis, comprising a plurality of arcuate brush seal segments for forming an annulus about and lying in a plane normal to the axis and between the components, each brush seal segment including an arcuate array of discrete, generally linearly extending bristles secured to the segment and extending therefrom at angles offset from radii of the segments, each of the brush seal segments having opposite ends, the bristles adjacent a first end of each segment extending at an acute angle relative to the first end of the segment such that a portion of the segment at the first end thereof is void of bristles, a support between the first end of each segment and an end of an adjacent segment, a plurality of bristles secured to each support and extending therefrom at angles offset from a radius of the segments at the first end of each segment, the plurality of bristles extending to the first end portions of the segments to provide bristles in the voids at the first ends thereof, each support being secured to one of the first end and the adjacent end of the segments.

In a further preferred embodiment according to the present invention, there is provided a rotary machine comprising a rotatable component, a component fixed against rotation, the components lying about a common axis, a plurality of arcuate seal ring segments carried by one of the components forming an annulus about and lying in a plane normal to the axis and between the components, each seal ring segment carrying at least one labyrinth tooth projecting radially for forming a labyrinth seal with another of the components, each seal ring segment carrying a brush seal segment, each brush seal segment including an arcuate array of discrete, generally linearly extending bristles secured to the segment and extending therefrom at angles offset from radii of the segments, the bristles lying axially spaced from one labyrinth tooth, each of the brush seal segments having opposite ends, the bristles adjacent a first end of each brush seal segment extending at an acute angle relative to the first end of the brush seal segment such that a portion of the brush seal segment at the first end thereof is void of bristles, a support between the first end of each brush seal segment and an end of an adjacent brush seal segment, a plurality of bristles secured to each support and extending therefrom at angles offset from a radius of the brush seal segments at the first end of each brush seal segment, the plurality of bristles extending to the first end portions of the brush seal segments to provide bristles in the voids at the first ends thereof, each support being secured to one of the first end and the adjacent end of the brush seal segments, whereby the plurality of bristles and the array of bristles project from the brush seal segments and from the one component for engagement with another of the components.

Accordingly, it is a primary object of the present invention to provide a novel and improved brush seal and combination labyrinth-brush seal for sealing between components rotatable relative to one another and particularly for retrofitting brush seals into labyrinth seals segmented for movement radially by spring or pressure forces enabling a full 360° of brush seal bristles.

BRIEF DESCRIPTION OF THE DRAWINGS

FIG. 3 is a schematic illustration of a turbine wheel illustrating a labyrinth seal between the wheel and a fixed component of the turbine;

FIG. 4 is an end elevational view of a segmented brush seal of the prior art showing a seal segmented into four segments;

FIG. 5 is an enlarged cross-sectional view thereof taken generally about on line 5—5 in FIG. 4;

BEST MODE FOR CARRYING OUT THE INVENTION

Figure 1:
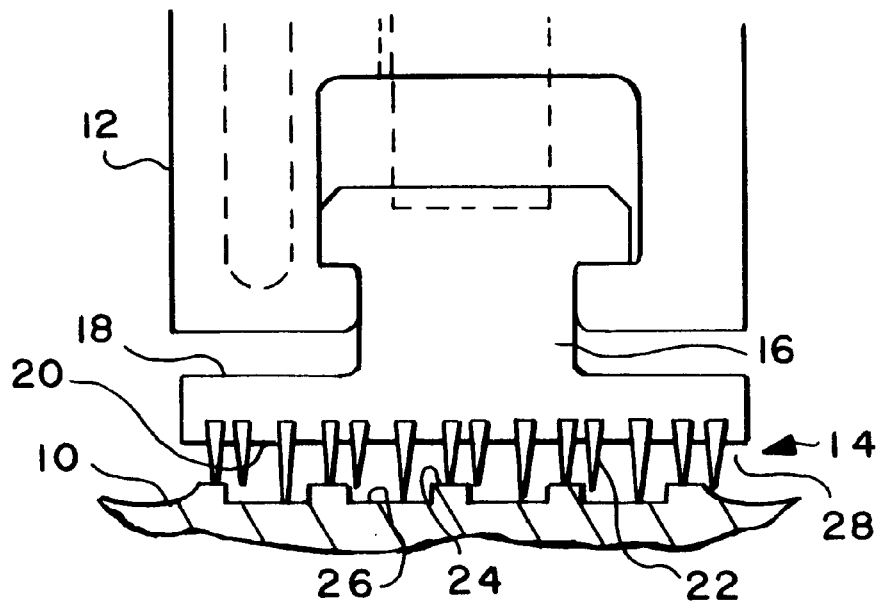
FIG. 1 is a schematic illustration of a sealing ring segment illustrating a labyrinth seal about a rotor.

Referring now to the drawing figures, particularly to FIG. 1, there is illustrated a portion of a rotary machine, for example, a steam turbine, having a turbine shaft 10 disposed in a turbine housing 12 and which shaft 10 is supported by conventional means, not shown, within turbine housing 12. A labyrinth seal, generally designated 14, between the rotating shaft 10 and the stationary housing 12, includes a seal ring 16 segmented circumferentially along radii to form packing ring segments disposed about shaft 10 separating high and low pressure regions on axially opposite sides of the ring. It will be appreciated that while only one seal 16 is disclosed, typically multiple-stage labyrinth seals are provided about rotor shafts. Each seal ring 16 is formed of an annular array of a plurality of arcuate seal elements or segments 18 having sealing faces 20 and a plurality of radially projecting, axially spaced teeth 22. The teeth are of a hi-lo design for obtaining close clearances with the radial projections or ribs 24 and the grooves 26 of the shaft 10. The labyrinth seal functions by placing a relatively large number of barriers, i.e., the teeth, to the flow of fluid from a high pressure region to a low pressure region on opposite sides of the seal, with each barrier forcing the fluid to follow a tortuous path whereby pressure drop is created. The sum of the pressure drops across the labyrinth seal is by definition the pressure difference between the high and low pressure regions on axially opposite sides thereof. These labyrinth seal ring segments, i.e., packing ring segments, are typically spring-backed and are thus free to move radially when subjected to severe rotor/seal interference. In certain designs, the springs maintain the seal ring segments 18 radially outwardly away from the rotor, for example, during startup and shutdown, with fluid pressure being supplied between the seal ring segments and the rotor housing to displace the seal ring segments radially inwardly to obtain a lesser clearance with the rotor, i.e., close the seals, after the rotor has been brought up to speed.

Figure 2:
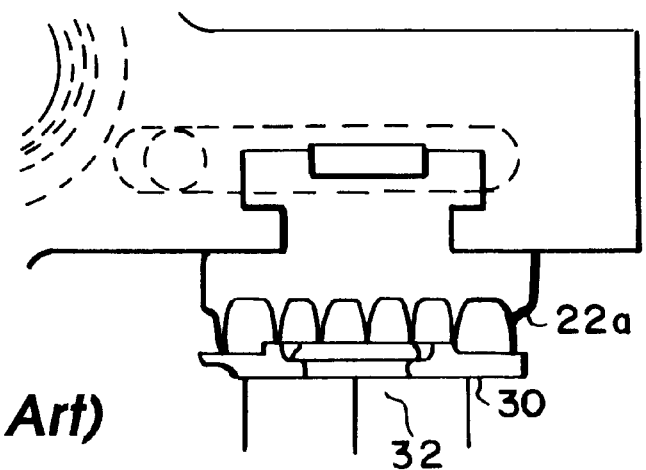
FIG. 2 is a schematic illustration of a labyrinth seal between a sealing ring segment and the covers for buckets or blades of a rotating component.

FIG. 2 illustrates a similar arrangement of a labyrinth seal employed at the tip of the rotating blades or turbine buckets for the rotating machine. Thus, in FIG. 2, the labyrinth seal teeth 22a lie in sealing relation to a bucket cover 30 formed on one or more turbine buckets 32. The principal of operation of the labyrinth seal at this location is similar as described above.

FIG. 3 illustrates a typical honeycomb-type labyrinth seal, for example, in a gas turbine. The labyrinth seal teeth 22b are mounted on the rotor wheel 33 and lie in radial opposition to a honeycomb structure 34 forming part of the stator. Thus, it will be appreciated that the labyrinth seal teeth may be disposed on the rotating component of the rotary machine.

Referring now to FIGS. 4 and 5, a typical prior art brush seal, generally designated 36, includes a plurality of bristles 38 extending generally in a radial direction and which bristles 38 are disposed or sandwiched between a pair of seal plates 40 and 42. The bristles are generally formed of alloy steel wire drawn to a diameter of 0.002–0.006 inches, although larger-diameter wires for use in higher pressure environments may be used. From a review of FIG. 5, it will be seen that the backing plate 42 prevents deflection of the bristles 38 under the loading from an upstream direction of the flow, while the distal ends of the bristles project from the distal edge of the plate 42 to engage the opposite component, e.g., the rotating shaft or wheel of a rotary machine. The bristles 38 are preferably welded between the plates 40 and 42. Additionally, it will be seen from a review of FIG. 4 that the bristles and plates are provided in segments about the circumference of the axis of the rotating machine.

Referring to FIG. 5, the bristles project from the distal end of backing plate 42 a distance h which corresponds to the maximum deflection of the rotor in a radial direction. Consequently, the distance h must be a minimum corresponding to that maximum deflection and is dependent on the expected relative radial deflection for the specific machine and seal location. It may be on the order of 0.040 inches. Note also that the upstream plate 40 is useful for maintaining the bristles in place during seal fabrication, although plate 40 is not necessary to the seal when in use if axial space is at a premium. It will also be noted in FIG. 4 that the bristles 38 extend along paths which are misaligned with the radius of the rotary machine. Thus, the bristles extend at an angle, preferably a common angle of approximately 30–60° to accommodate radial excursions of the shaft whereby the bristles may deflect without buckling.

Referring back to FIG. 4, it will be seen that the seal plates 40 and 42 form a plurality of arcuate segments about the seal. As indicated, the adjoining end surfaces of these brush seal segments register and engage with one another along angled end faces corresponding to the angle of the bristles. That is, the end faces of the adjoining segments are cut at complementary common angles of approximately 30–60° relative to radii of the segments to correspond to the angle of the bristles. While this affords a satisfactory seal and a continuous 360° array of bristles about the seal, a brush seal of this type cannot be accommodated in labyrinth-type seals or retrofitted in labyrinth-type seals where the labyrinth seal segments per se are movable radially inwardly and outwardly under spring or fluid pressure.

Figure 6A:
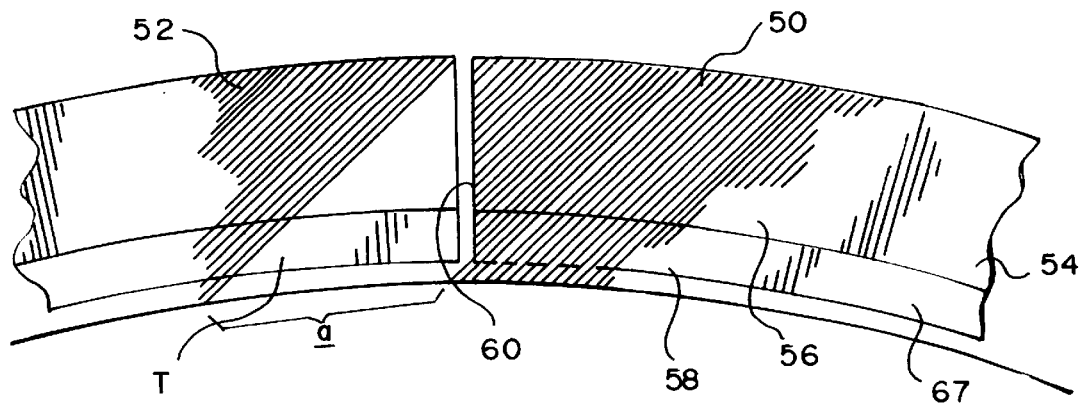
FIG. 6A is an enlarged fragmentary view with portions broken out illustrating a plurality of brush seal segments aligned to form a ring about an axis and illustrating a triangular area void of bristles.
Figure 7:
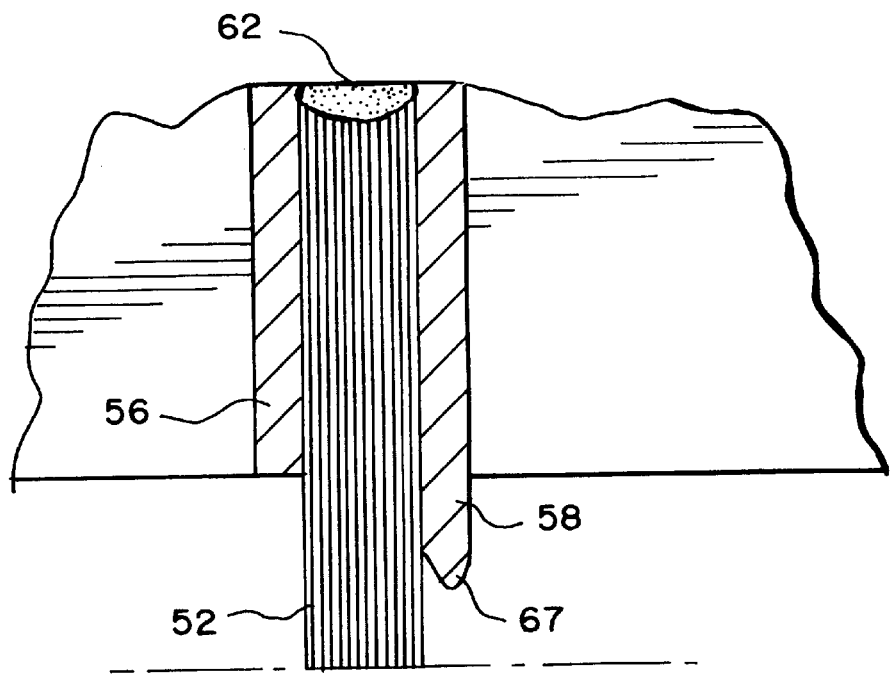
FIG. 7 is an enlarged cross-sectional view taken generally about on line 7—7 in FIG. 6.

In accordance with the disclosure of the prior application Ser. No. 08/719,667 and referring to FIG. 6A, the brush seal 50 includes a plurality of bristles 52 extending at the typical angle, i.e., 30–60° relative to radii of the brush seal, i.e., the bristles at each circumferential position along each segment extend at a generally common angle relative to a radius extending to the bristles at such circumferential position. However, the individual brush seal segments 54 comprised of one or both of seal plates 56 and 58 have end surfaces formed along a radii of the brush seal. That is, the end surface 60 of each segment 54 lies along a radius relative to the axis of the components being sealed. This permits the segment 54 to move radially inwardly and outwardly relative to one another as necessary for labyrinth seal segments in certain turbine applications. It will also be appreciated from a review of FIG. 7 that the bristles 52 located between the seal plates 56 and 58 are secured at common ends to the plates and to one another by a weld 62. With that construction, it will be appreciated that there will be an area adjacent the adjoining segments 54 which do not have bristles, i.e., are void of bristles. That is, the bristles at the end of one segment are cut along the radial line of the segment, while the bristles of the adjoining end segment, because of the "cant" of the bristles, project at a circumferential distance a spaced from the juncture of the segments. The bristles at the end of the adjoining segment are cut along a radius of the segment and hence terminate along the radial extending end face of the adjoining segment. This leaves a generally triangular area T at the end of each segment without or void of bristles where that segment joins with an adjacent segment.

In the prior application, there is disclosed a backing plate in the form of a labyrinth tooth profile and which labyrinth tooth profile, carried by the multiple segments, extends 360° about the seal to provide full sealing capability about the axis. Thus, the backing plate may comprise a labyrinth tooth 67 for each segment which teeth extend the full 360° about the axis of the components being sealed or only in the local regions of missing bristles. Note also that the bristles are supported against the labyrinth tooth 67 in each segment, at least to the point where the tooth is tapered. Consequently, where brush seals are retrofit to labyrinth seal segments that are either spring-backed or held in place by pressure forces, the individual labyrinth seal segments carrying the brush seals are free to move radially independently of one another, while the many benefits of a brush seal are provided as adjunct to the labyrinth seal.

Figure 6B:
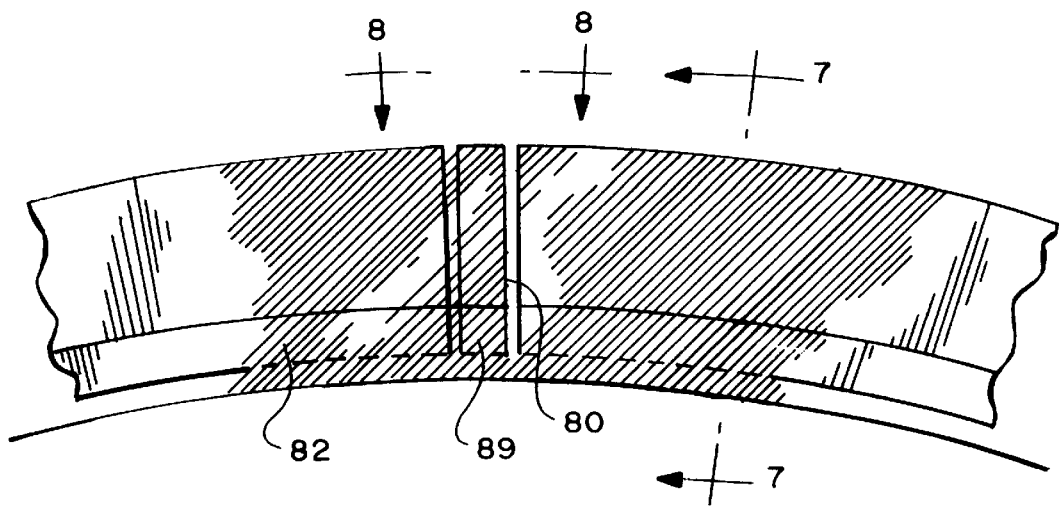
FIG. 6B is a view similar to FIG. 6A illustrating a support for additional bristles between adjoining brush seal segment ends to complete the bristle array at the juncture of the segments.
Figure 8:
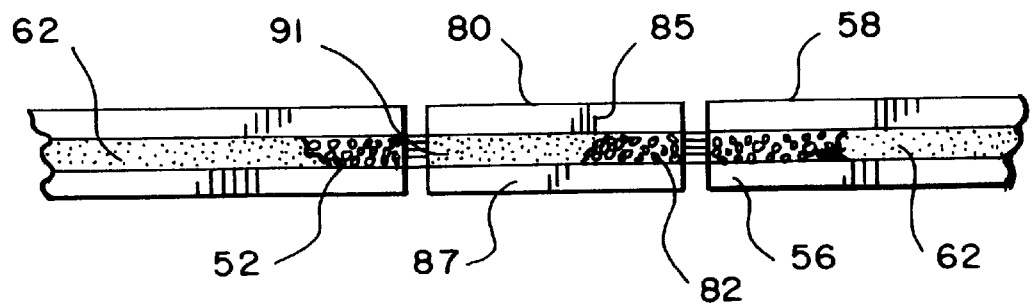
FIG. 8 is an enlarged cross-sectional view taken generally about on line 8—8 in FIG. 6B.

In accordance with the present invention, and referring to FIG. 6B, there is provided a support 80 to which a plurality of bristles 82 are secured at proximal ends thereof. Support 80 may comprise a flat plate extending in a radial direction and having a very small circumferential extent, the plate having substantially the same radial extent of the brush seal segment. The flat plate support 80 may be aligned in the plane of one of the seal plates, i.e., the downstream seal plate 58. Alternatively, the support 80 may comprise a generally U-shaped channel extending lengthwise in a radial direction with the legs of the U-shaped channel lying in the planes of the seal plates 56 and 58, respectively. The proximal ends of the bristles reside in the channel. As a further alternative, an L-shaped angle in radial cross-section may be used with one of the legs of the L-shaped support aligned with the downstream seal plate 58. Preferably the support 80 may comprise a pair of plates 85 and 87 in FIG. 8 housing the bristles 82 therebetween. Other shapes, of course, are possible. The bristles 82 are the same type as the bristles 52. However, the bristles 82 have various lengths commencing with the largest length having proximal end portions secured to support 80 at a radially outermost position, with the shortest bristles having proximal end portions secured at the radial innermost portions of the support 80. The bristles 82 extend at the same cant angle as the bristles 52 in the region adjacent the joint between adjoining segments. The bristles are likewise secured between plates 85 and 87 by welding along the radially outermost portions of the bristles and plates at 91 in FIG. 8 and also along the radially extending edge of the plates opposite the edge from which the bristles project.

Preferably, the segments are cut slightly shorter in circumferential extent than would otherwise be the case absent support 80. This provides adequate space between the ends of the segments for receiving support 80 with an additional clearance to accommodate the radial inward and outward movement of the packing ring segments, e.g., illustrated in FIG. 9. The support 80 is secured to one or the other of the ends of the adjoining segments and preferably is secured to the end of the segment in which the triangular open section void of bristles occurs. It will be appreciated that with the support 80 secured, for example, by welding, to the end of the segment, the bristles extend between the seal plates 56 and 58 of the brush seal segment, filling the triangularly-shaped void T for projection of their distal ends beyond the edges of the backing plates and particularly beyond the edge of the backing seal plate 58 with the tapered tooth profile. In this manner, it will be appreciated that the bristles extend in the gap between the fixed and rotational components bearing against the rotational component for substantially the full 360° arc of the brush seal. Also, the radially innermost end of the plate 85 of support 80 serves as a backing plate and its radially innermost edge may have a tapered tooth configuration 89 similarly as the tapered tooth configuration of the backing plate 58 of the brush seal segments whereby the brush seal is backed by a labyrinth tooth segments substantially throughout the full 360° arc of the combined labyrinth/brush seal.

Figure 6C:
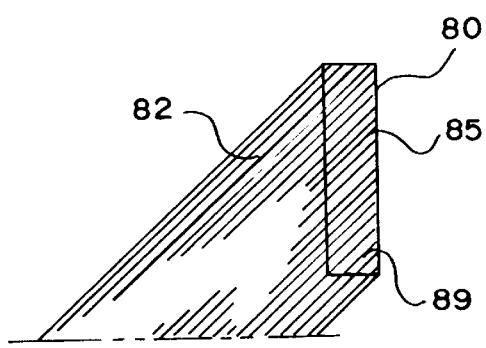
FIG. 6C is a view similar to FIG. 6B illustrating only the support with attendant bristles for disposition between end faces of the segments.
Figure 9:
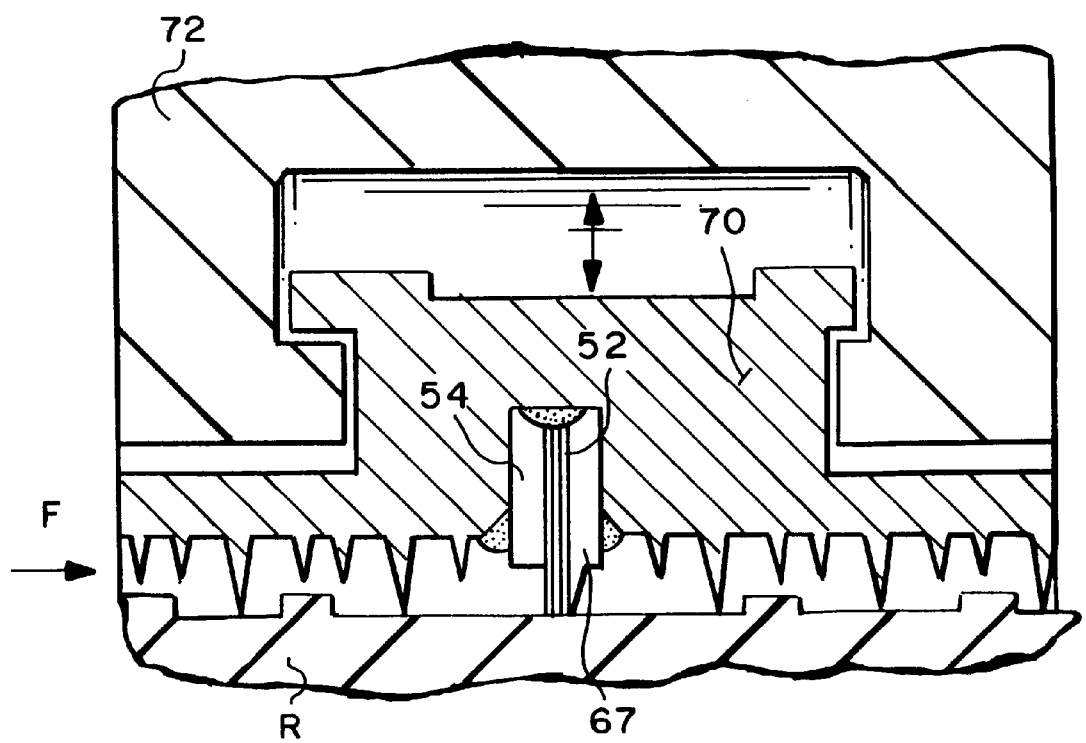
FIG. 9 is a schematic illustration of a combined labyrinth brush seal of the present invention in a sealing ring segment for sealing against a rotor.

Referring to FIG. 9, there is illustrated an example of a brush seal according to the present invention incorporated as a retrofit or as original equipment in a labyrinth seal. Thus, the labyrinth seal segments 70 about rotary shaft R may be removed from housing 72 and one or more of the teeth of the labyrinth seal replaced with a brush seal. In the illustrated form, one of the labyrinth seal teeth, e.g., the centrally-located labyrinth seal tooth, is removed and a groove is formed for receiving the brush seal segments 54. In the direction of flow indicated at F, the labyrinth tooth 67 formed by one of the seal plates lies on the downstream side of the bristles 52 and the entire brush seal including the segments illustrated in FIG. 6 may be welded into place. With the end faces of the brush seal segments 54 lying parallel to the end faces of the labyrinth seal segments at like circumferential positions, it will be appreciated that the combined labyrinth seal segments and brush seal segments may move radially inwardly and outwardly with the tips of the bristles engaging the rotor R substantially throughout the full 360° circumference of the rotor While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An annular brush seal for disposition between a rotatable component having an axis of rotation and another component about said axis, comprising:
    a plurality of arcuate brush seal segments for forming an annulus about and lying in a plane normal to said axis and between the components, each said brush seal segment including an arcuate array of discrete, generally linearly extending bristles secured to said segment and extending therefrom at angles offset from radii of said segments;
    each of said brush seal segments having opposite ends, the bristles adjacent a first end of each segment extending at an acute angle relative to said first end of said segment such that a portion of said segment at said first end thereof is void of bristles;
    a support between said first end of each segment and an end of an adjacent segment;
    a plurality of bristles secured to each said support and extending therefrom at angles offset from a radius of said segments at said first end of each said segment, said plurality of bristles extending to the first end portions of said segments to provide bristles in said voids at said first ends thereof;
    each said support being secured to one of said first end and said adjacent end of said segments.

2. A brush seal according to claim 1 wherein each segment includes a pair of arcuate elements on opposite sides of the bristles with tips of the bristles extending beyond circumferentially extending edges of said elements.

3. A brush seal according to claim 2 wherein portions of said bristles remote from said tips are welded to said elements.

4. A brush seal according to claim 2 wherein portions of said bristles remote from said tips are welded to one another and to said elements.

5. A brush seal according to claim 1 wherein said bristles secured to said support have variable lengths.

6. A brush seal according to claim 5 wherein said bristles secured to said support have decreasing lengths in a radial inward direction.

7. A brush seal according to claim 1 wherein said support is secured to said first end of said segment.

8. A brush seal according to claim 1 wherein each segment includes a pair of arcuate elements on opposite sides of the bristles with tips of the bristles extending beyond circumferentially extending edges of said elements, one of said elements including an arcuate tooth having a tapered edge forming a labyrinth seal tooth terminating in a radial direction between said bristle tips and an edge of another of said elements.

9. A brush seal according to claim 8 wherein said tooth extends to said first end of said segment and in part lies axially adjacent to and defines said first end of said segment portion void of bristles.

10. A brush seal according to claim 1 wherein each segment includes a pair of arcuate elements on opposite sides of the bristles with tips of the bristles extending beyond circumferentially extending edges of said elements, said first end of each segment lying along a radius of said segment, the bristles secured to said support extending from said support between said elements and terminating radially inwardly of said element edges.

11. A brush seal according to claim 1 wherein the bristles at an end of said adjacent segment terminate along a radially extending end thereof such that, upon assembly of said segments into said annulus, said first end has a generally triangular-shaped area adjacent a juncture of the segments void of a portion of said array of bristles with the bristles secured to said support substantially filling said void.

12. A rotary machine comprising:
    a rotatable component;
    a component fixed against rotation;
    said components lying about a common axis;
    a plurality of arcuate seal ring segments carried by one of said components forming an annulus about and lying in a plane normal to said axis and between said components, each said seal ring segment carrying at least one labyrinth tooth projecting radially for forming a labyrinth seal with another of said components, each seal ring segment carrying a brush seal segment, each said brush seal segment including an arcuate array of discrete, generally linearly extending bristles secured to said segment and extending therefrom at angles offset from radii of said segments, said bristles lying axially spaced from said one labyrinth tooth;
    each of said brush seal segments having opposite ends, the bristles adjacent a first end of each brush seal segment extending at an acute angle relative to said first end of said brush seal segment such that a portion of said brush seal segment at said first end thereof is void of bristles;
    a support between said first end of each brush seal segment and an end of an adjacent brush seal segment;
    a plurality of bristles secured to each said support and extending therefrom at angles offset from a radius of said brush seal segments at said first end of each said brush seal segment, said plurality of bristles extending to the first end portions of said brush seal segments to provide bristles in said voids at said first ends thereof;
    each said support being secured to one of said first end and said adjacent end of said brush seal segments;
    whereby said plurality of bristles and said array of bristles project from said brush seal segments and from said one component for engagement with another of said components.

13. A rotary machine according to claim 12 wherein each brush seal segment includes a pair of arcuate elements on opposite sides of the bristles with tips of the bristles extending beyond circumferentially extending edges of said elements.

14. A rotary machine according to claim 13 wherein portions of said bristles remote from said tips are welded to said elements.

15. A rotary machine according to claim 13 wherein portions of said bristles remote from said tips are welded to one another and to said elements.

16. A rotary machine according to claim 13 wherein one of said elements comprises an arcuate labyrinth seal tooth having a tapered edge terminating at a radial location between said bristle tips and another of said elements, said arcuate labyrinth seal tooth and said one labyrinth seal tooth being axially spaced from one another.

17. A rotary machine according to claim 16 wherein said arcuate labyrinth seal tooth extends to said first end of said brush seal segment and in part defines said first end of said brush seal segment portion void of bristles.

18. A rotary machine according to claim 12 wherein each brush seal segment includes a pair of arcuate elements on opposite sides of the bristles with tips of the bristles extending beyond circumferentially extending edges of said elements, said first end of each brush seal segment lying along a radius of said brush seal segment, the bristles secured to said support extending from said support between said elements and radially inwardly of said element edges.

19. A rotary machine according to claim 16 wherein said bristles secured to said support have variable lengths.

20. A brush seal according to claim 13 wherein said bristles secured to said support have decreasing lengths in a radial inward direction, said support being secured to said first end of said brush seal segment.

* * * * *